US005161730A

United States Patent [19]

McGuire et al.

[11] Patent Number: 5,161,730

[45] Date of Patent: Nov. 10, 1992

[54] METHOD FOR FABRICATING A WELDMENT

[75] Inventors: Darrel McGuire, Franklin; Jonathan M. Christensen, Wauwatosa; Rodney R. Lautenbach, Muskego, all of Wis.

[73] Assignee: Harnischfeger Corporation, Brookfield, Wis.

[21] Appl. No.: 804,856

[22] Filed: Dec. 6, 1991

[51] Int. Cl.[5] .......... B23K 31/02

[52] U.S. Cl. .......... 228/182; 228/227; 228/242

[58] Field of Search .......... 228/175, 178, 182, 214, 228/227, 242

[56] References Cited

PUBLICATIONS

Metals Handbook Ninth Edition, vol. 6, "Residual Stresses and Distortion", pp. 856-892, copyright 1983.

*Primary Examiner*—Samuel M. Heinrich
*Attorney, Agent, or Firm*—Jansson & Shupe, Ltd.

[57] ABSTRACT

The invention is an improved method for fabricating apparatus weldments such as, for example, wheeled end trucks for overhead cranes. The apparatus has a pair of spaced, wheeled end modules, a pair of beams extending between the modules and at least one reference such as a reference plane used to initially align end modules placed in a fixture prior to beam-module attachment by welding. The improved method includes the steps of positioning the modules with respect to the reference, tack welding each piece in position for permanent attachment to the modules and permanently attaching each piece to a module. Permanent attachment includes applying welds in sequence to the first end of one beam, to the second and first ends (in that order) of the second beam and, finally, to the second end of the first beam. Where each module-and-beam-end attachment has plural welding paths, preferred steps are described for the order in which each path at each beam end is to be welded. The effects of heat-induced piece distortion, which is unavoidable, are essentially canceled and misalignment in the finished apparatus is substantially avoided.

17 Claims, 5 Drawing Sheets

METHOD FOR FABRICATING A WELDMENT

FIELD OF THE INVENTION

The invention relates generally to a method for making a structure by welding and, more particularly, to a method for weldment fabrication which avoids or at least minimizes heat-induced distortion of structural members used in making the weldment.

BACKGROUND OF THE INVENTION

Products and apparatus fabricated by welding metal parts together are common. Equally common is the understanding that during welding, heat is transferred to the metal parts and can cause a degree of distortion in such parts. For many applications, such distortion is not critical, either because the final product does not require close dimensional tolerances or because such product will be clamped or otherwise integrated into a larger structure which forcibly removes the distortion.

On the other hand, there are applications for fabricated weldments which are much more demanding in terms of dimensional tolerances. That is, certain types of fabricated weldments require a high degree of precision in the final product —— significant distortion and resulting misalignment simply cannot be tolerated.

An example of such an application involves fabricated end trucks for cranes. Overhead traveling cranes have parallel main girders supported at either end by a wheeled end truck. The trucks ride on elevated rails as the crane transports loads from one location to another. Similarly, the crane trolley rides back and forth on girder-mounted rails and is supported on such rails by end trucks.

Typically, each end truck has a pair of spaced-apart flanged wheels, one near either extremity of the truck. To avoid abnormal wear of rails and wheels alike, such wheels must be "lined up" with respect to the rail. Wheels that are angularly misaligned with respect to a rail are said to be "skewed."

To describe this phenomenon in more precise, geometry-like terms and with respect to a crane end truck, assume that each wheel has a "wheel plane," i.e., a plane through the wheel perpendicular to its axis of rotation and midway between its lateral sides. In order for the wheels to track straight and true along the rail, the wheel plane of each of the two wheels must be substantially vertical and coincident with one another and with the rail longitudinal centerline. A wheel that is skewed (and there may be one or two such wheels on a particular end truck) has a wheel plane that is vertical but laterally angularly oriented with respect to that of the other wheel and/or with respect to the rail centerline.

Another type of wheel misalignment, less of a potential problem than wheel skewing described above, involves wheels mounted with axes of rotation which are not parallel to the rail centerline. That is, a wheel (or both wheels) and its axis of rotation are tipped inward or outward. As used herein, misalignment of this type is said to involve a "tipped" wheel. And a tipped wheel has a wheel plane which is not vertical. While one or more tipped wheels can cause undue wear, this type of misalignment is significantly less serious than wheel misalignment by skewing.

An improved weldment fabrication method which overcomes the aforementioned problems would be an important advance in the art.

OBJECTS OF THE INVENTION

It is an object of this invention to provide an improved method for fabricating a weldment which overcomes some of the problems and shortcomings of the devices of the prior art.

Another object of this invention is to provide an improved method for fabricating a weldment which avoids or at least minimizes the effect of heat-induced distortion of weldment structural members.

Still another object of this invention is to provide an improved method for fabricating a weldment such as a crane end truck.

Yet another object of this invention is to provide an improved method for fabricating a specific type of weldment so that skewing of crane end truck wheels is substantially avoided.

Another object of this invention is to provide an improved method for fabricating a weldment whereby standard end truck wheel modules can be stocked for later welded fabrication of an end truck having a required length.

These and other important objects will be apparent from the following descriptions taken in conjunction with the drawing.

SUMMARY OF THE INVENTION

The invention is an improved method for fabricating apparatus weldments. While such method has relatively broad application, it is described for exemplary purposes in connection with fabrication of apparatus such as wheeled end trucks for overhead cranes.

The apparatus has a pair of spaced end modules, each with a flanged wheel, and a pair of beam-like pieces extending between the modules. The apparatus is fabricated in view of at least one "reference," e.g., a reference plane used to initially align end modules. Such modules are placed in and supported by a fixture prior to beam-module attachment to one another by welding. The reference plane most readily used is vertical and "centered" on that portion of the fixture used for module support.

The improved method includes the steps of positioning the modules with respect to a primary reference, e.g., a reference plane, and placing each beam-like piece in position for permanent attachment to the modules. Typically, such positioning occurs when the modules are placed in a well-constructed fixture and placement for permanent attachment is preferably by tack welding. Each piece and a module are then permanently attached to one another by applying final welds alternately to the pieces. The effect of heat-induced piece distortion is essentially canceled and misalignment in the finished apparatus is substantially avoided.

More specifically, the modules include first and second modules, each of which has a wheel. Each wheel has a wheel plane as described above and the modules are preferably positioned so that prior to placement of the pieces, the wheel planes are substantially coincident with the primary reference plane.

The apparatus may also have first and second references such as reference lines and the positioning step includes positioning each module with respect to the first reference or the second reference. Preferably, each module is positioned so that the axis of rotation of its wheel is coincident with a different reference line. When the new method is used to fabricate an apparatus like an end truck, accurate pre-attachment positioning (using at least the primary reference and, perhaps, the first and second references, helps assure high quality fabrication.

It should be appreciated that when reference planes and lines are considered as geometric features, the reference plane and lines can be almost anywhere spatially. Module orientation can be set up so that each module, its wheel plane and (if necessary) its axis of rotation are at known positions with respect to such reference plane and lines. However, the new method is most easily (and, probably, most accurately) used if the wheel planes and axes of rotation are coincident with references, as described. Such arrangement avoids making complex computations involving the locus of the wheel plane and axes of rotation with respect to their references.

After module positioning, the pieces are placed for permanent attachment as described above. The placing step includes tack welding each piece to a module by applying tack welds alternately to the pieces. Each beam-like piece includes a first end for attachment to the first module and a second end for attachment to the second module. More specifically, tack welding includes a first tacking step of tacking the first end of the first piece to the first module and tacking the second end of the second piece to the second module. Preferably, tack welding further includes a second tacking step of tacking the first end of the second piece to the first module and tacking the second end of the first piece to the second module.

After temporarily attaching the pieces to the modules by tack welding, the pieces and modules are permanently welded to together. In general, this is by applying final welds alternately to the pieces, thereby fabricating the weldment without significant misalignment of the modules with respect to the primary reference. More specifically, permanent welding includes welding the first end of the first piece to the first module and welding the second end of the second piece to the second module. It also includes welding the first end of the second piece to the first module and welding the second end of the first piece to the second module.

Specific aspects of the preferred method recognize that module-piece attachment may be along more than one welding "path." A path is the region, linear or curved in shape, where the weld fillet is applied to span the module and the piece to rigidly attach them to one another. With pieces which are elongate —— as with the beam-like piece of a crane end truck —— the piece has a longitudinal axis.

Where each of at least two end-and-module attachments include at least two welding paths having differing lengths projected to that axis, each piece and each module are permanently welded to one another by the steps of (1) making a final weld along that path adjacent to the first end of the first piece and having the shorter projected length and (2) making a final weld along that path adjacent to the second end of the second piece and having the shorter projected length. By first welding the paths having the shorter length (as projected to the aforementioned piece axis), one minimizes the distortion arising from the application of heat along that path.

Additional steps include (3) making a final weld along that path adjacent to the first end of the second piece and having the shorter projected length and (4) making a final weld along that path adjacent to the second end of the first piece and having the shorter projected length.

Final welds along paths having longer projected lengths are made in the same order as that in which final welds are made along paths having the shorter projected length. In a more specific situation involving crane end trucks, paths having shorter projected lengths are generally normal to the longitudinal axis and paths having longer projected lengths are generally parallel to such axis.

Further details regarding the improved method are set forth in the detailed description taken in conjunction with the drawing.

DETAILED DESCRIPTION OF PREFERRED EMBODIMENTS

The improved method has relatively broad application in fabrication of apparatus weldments requiring close dimensional tolerances. By way of example, such method is described in connection with fabrication of a welded wheeled end truck 10 for an overhead crane 11. Before describing the method, readers will find it helpful to first understand certain aspects of those components used to fabricate such an end truck 10.

Figure 1A:
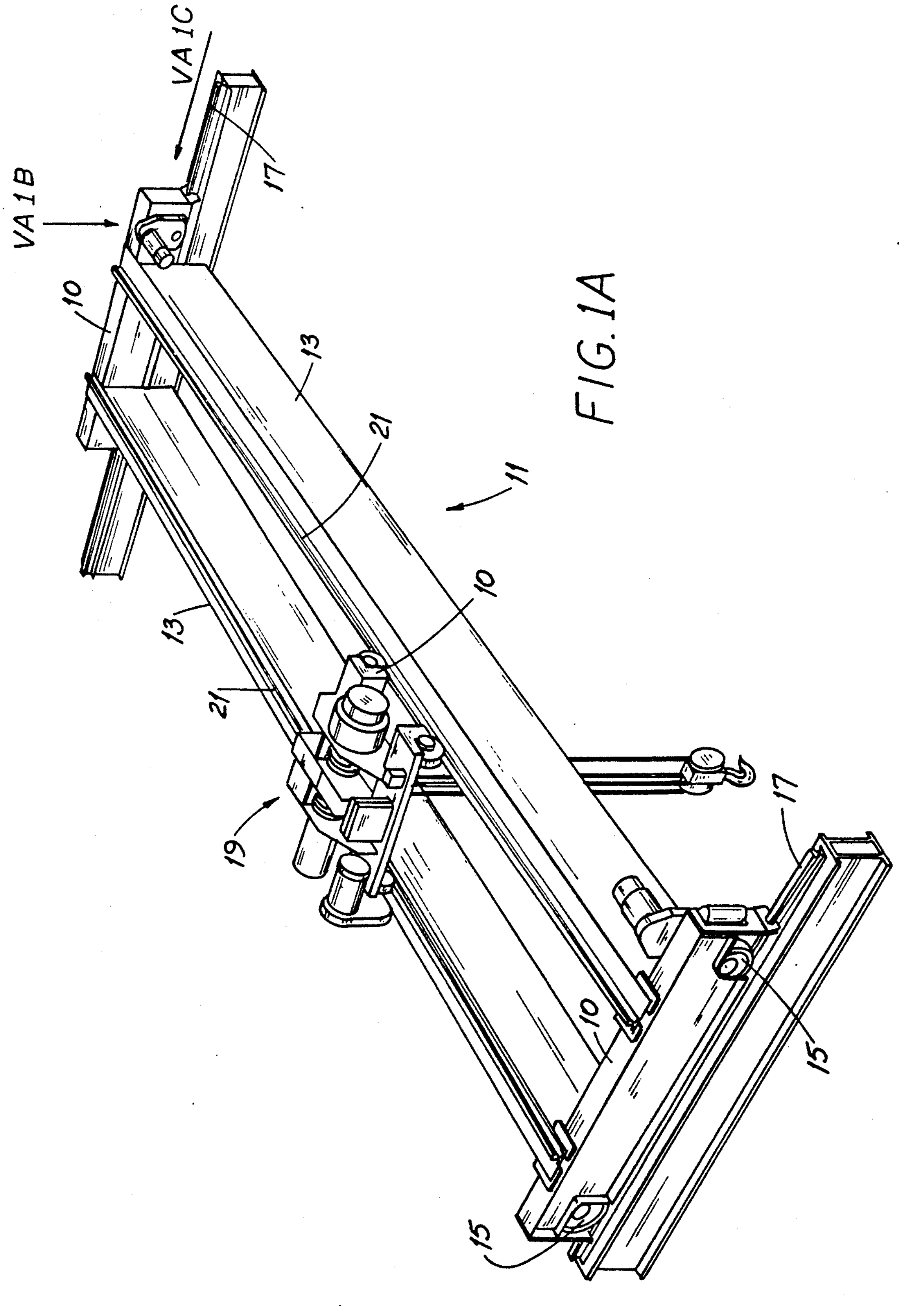
FIG. 1A is a simplified perspective view of an overhead travelling crane having end trucks fabricated by the improved method.

Referring first to FIG. 1A, a typical overhead crane 11 includes a pair of girders 13 supported at either end by an end truck 10. Each end truck 10 has a pair of wheels 15 rolling along a column-supported rail 17. The crane 11 also includes a trolley 19 traveling back and forth along rails 21 mounted on the girders 13. Such trolley 19 also has a pair of end trucks 10, one at either end.

Figure 1B:
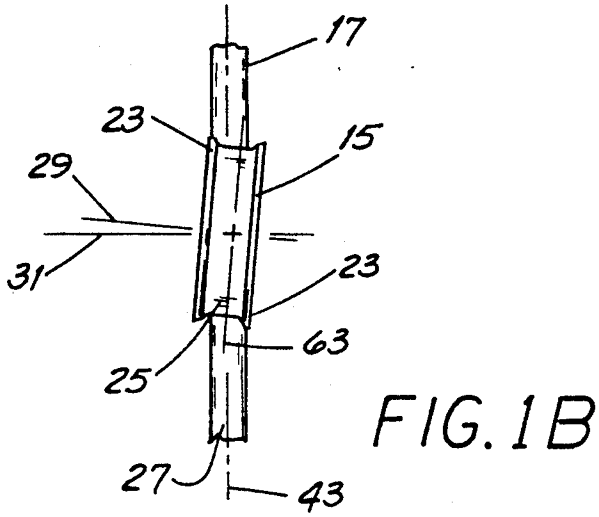
FIG. 1B is a simplified top plan view of a skewed end truck wheel on a rail, with parts omitted and others broken away, such view being along viewing axis 1B of FIG. 1A.

The close-tolerance requirements of end truck construction will be better appreciated by imagining the adverse effect of misalignment upon rail 17 and wheel 15 alike. Considering FIGS. 1B and 1C, such FIGURES greatly exaggerate both types of wheel misalignment for purpose of illustrating this point.

Figure 1C:
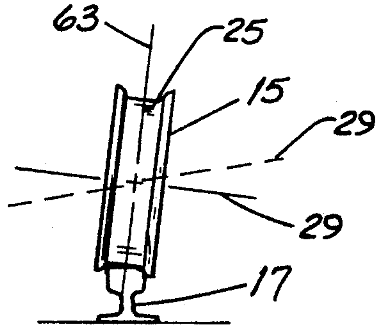
FIG. 1C is a simplified elevation view of a tipped end truck wheel on a rail, with parts omitted, such view being along viewing axis 1C of FIG. 1A.

In FIGURE IB, the skewed wheel 15 rolls "angularly" along the rail 17. The surface of the rail 17, the wheel flanges 23 and the wheel tread 25 are all thereby caused to be scuffed and unduly worn. In FIG. 1C, the tipped wheel 17 rolls along a rail surface other than the rail top or "crown" 27. And such wheel tipping can be inward as illustrated or outward as represented by the dashed axis of rotation 29. Of course, a wheel 17 may be misaligned by both skewing and tipping. As used herein, a wheel 17 which is neither skewed or tipped is said to be "true." And a wheel 17 which is both skewed and tipped is said to be "untrue."

The Inventive Method

In this specification, there is repeated reference to first and second modules, first and second ends and the like. As used herein (and with one exception), "first" refers to that item appearing to the left in FIGS. 2, 3, 4A and 4B and "second" refers to that item appearing to the right in such FIGURES. When referring to beam-like pieces, the "first" piece is that nearest the viewer in FIGS. 2 and 3.

Referring next to FIGS. 2, 3, 4A and 4B, a typical end truck 10 has a first reference 31 and a second reference 33, each of which comprises a reference line. Each truck 10 also includes a first module and a second module, 35 and 37, respectively; first and second beam-like pieces 39 and 41, respectively, and at least one reference, i.e., a primary reference plane 43 as shown on edge in FIGS. 1B and 4A.

Each module 35, 37 includes a double flanged wheel 15 supported by an axle 45 having an axis of rotation 29. The axle 45 is journalled for rotation in bearings in the module side plates 47 and hubs 49. Each module 35, 37 also has a pair of attachment plates 51, 53 extending toward the other module 37, 35 when the truck 10 is finally fabricated. During final fabrication, the plates 51, 53 are welded to the pieces 39, 41 according to the method described below.

Figure 2:
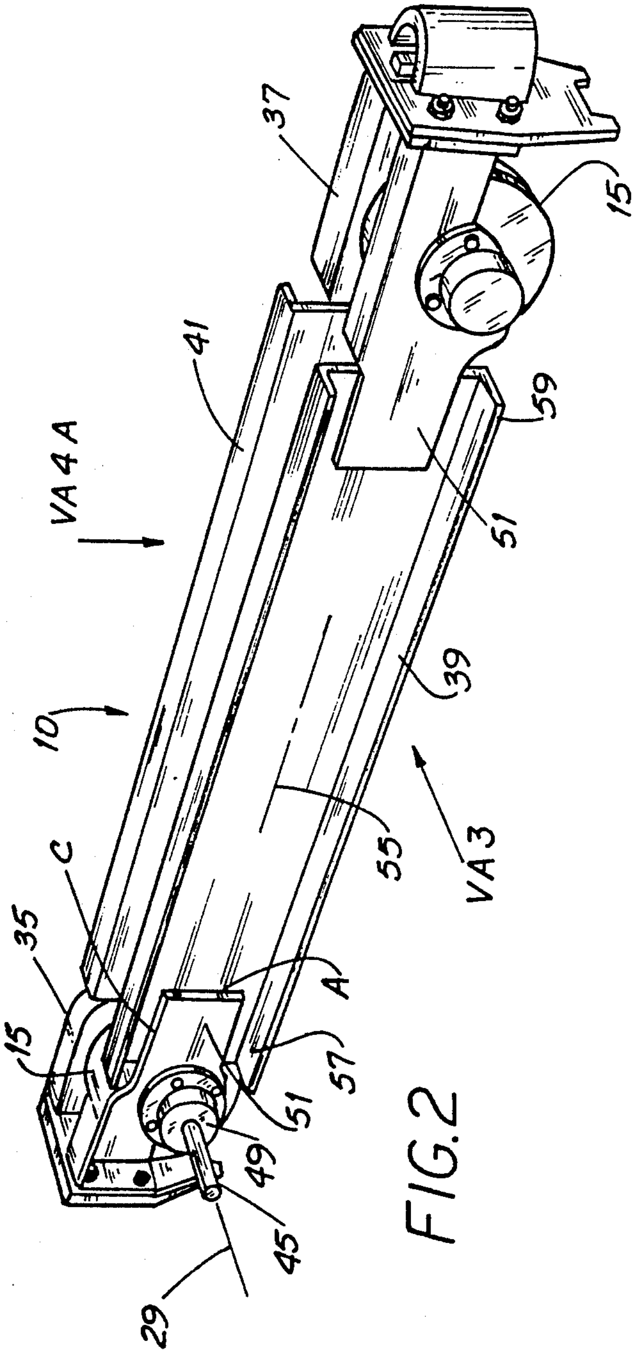
FIG. 2 is a perspective view of a crane end truck shown in FIG. 1A.
Figure 3:
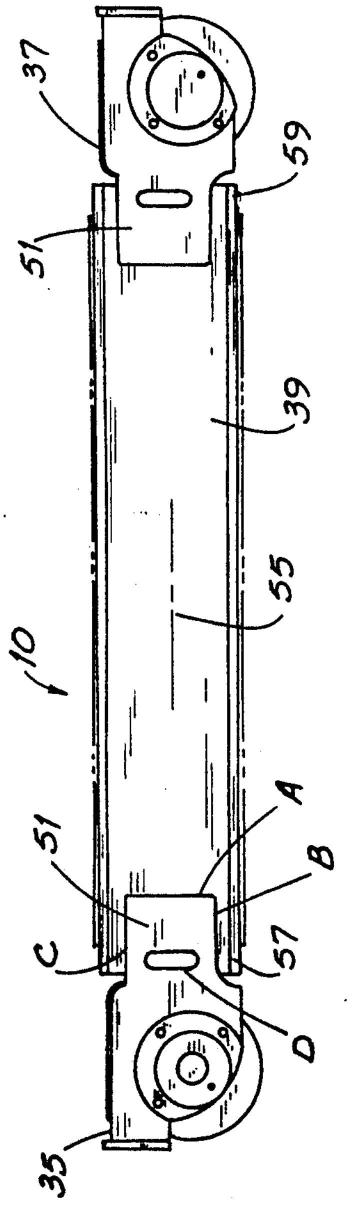
FIG. 3 is a representative side elevation view of the end truck of FIG. 2 taken along the viewing axis VA3 with parts omitted and other parts shown in dash-line representation.

Each piece 39, 41 includes a longitudinal axis 55, and first and second ends, 57 and 59, respectively. Each piece 39, 41 is preferably configured as a channel of generally "U" cross-sectional shape as shown in FIG. 2.

Referring now to FIGS. 3, 4A, 4B and 5, each attachment plate 51, 53 includes outer and inner spaced vertical edges A and D, respectively, and top and bottom spaced horizontal edges C and B, respectively. The end truck 10 also has four "corners" which are referred to as corners C1, C2, C3 and C4.

During fabrication, the edges A, B, C, D generally define the welding paths where a weld fillet 61 is applied. As will be recognized by one of ordinary skill in the welding art, the fillet 61 is that which rigidly, permanently attaches two components, e.g., a plate 51, 53 and a piece 39, 41 to one another.

Figure 5:
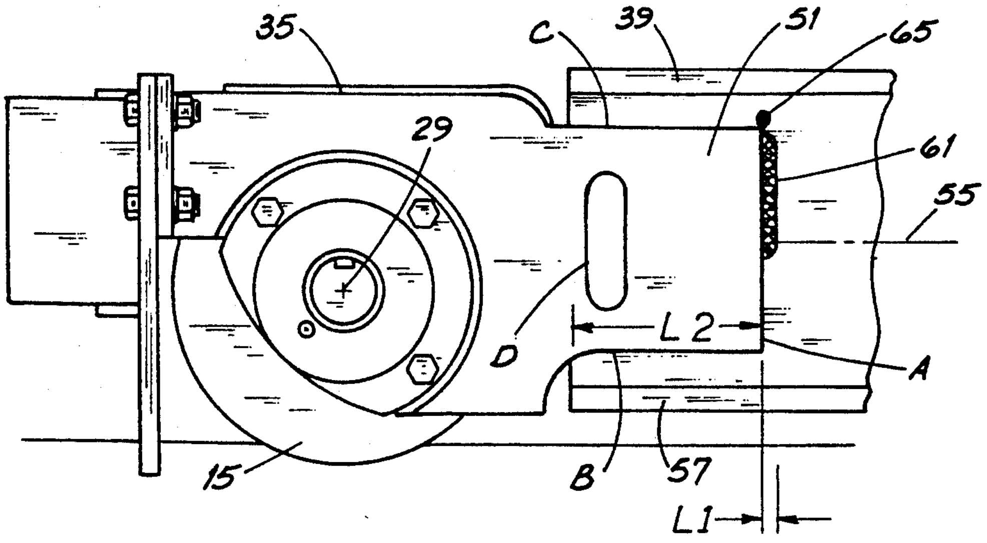
FIG. 5 is a side elevation view of a portion of the end truck of FIGS. 2 and 3, with parts broken away and other parts omitted.

From a further inspection of FIG. 5, it will be appreciated that edge A and the welding path therealong has a "length" L1 projected to and measured parallel to the long axis 55 of the piece 39. Length L1 is significantly shorter than the length L2 of the edges B or C as projected to the axis 55. Since edge A is normal to the axis 55, its length projected thereto is substantially equal to the width of the weld fillet 61. And of course, the projected length of edges B and C is equal to their actual lengths since such edges B, C are parallel to the axis 55.

Figure 6:
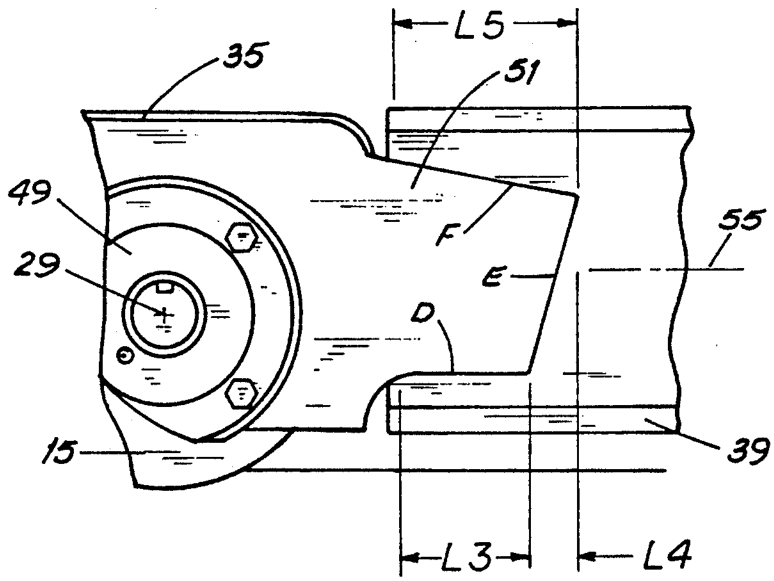
FIG. 6 is a side elevation view of a second embodiment of the end truck portion shown in FIG. 5.
Figure 7:
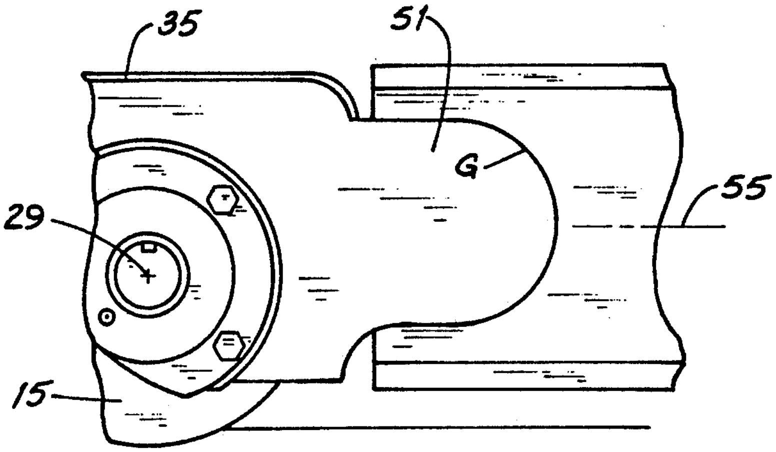
FIG. 7 is a side elevation view of a third embodiment of the end truck portion shown in FIG. 5.

For further purposes of describing the inventive method, FIG. 6 illustrates an attachment plate 51 having a different shape than the plate 51 shown in FIG. 5. The plate of FIG. 6 includes three edges D, E, F. The edge D has a projected length L3, the edge E has a projected L4 and the edge F has a projected length L5, all as projected to the longitudinal axis 55 of the piece 39. The attachment plate 51 of FIG. 7 has an edge G which is curved substantially along its entire length.

The inventive method, which will now be described, involves steps wherein welding is performed on "first" and "second" components of the described structure, at particular edges A, B, C, D and at particular corners C1, C2, C3 and C4. To more easily grasp the description of the method, the reader is encouraged to have these aspects well in mind.

As set out above, each attachment plate 51, 53 of each module 35, 37 is welded to the end 57, 59 of a particular piece 39, 41 by welding along several paths at each plate 51, 53. Briefly described, the improved method provides permanent module-piece attachment by applying welds alternately to the pieces 39, 41 and along individual paths in sequence.

The improved method includes the steps of positioning the modules 35, 37 with respect to a primary reference, e.g., a reference plane 43, and placing each beam-like piece 39, 41 in position for permanent attachment to the modules 35, 37. Preferred positioning is by using a fixture and placement for permanent attachment is preferably by tack welding. Each piece 39, 41 and the modules 35, 37 are then permanently attached to one another by applying final welds alternately to the pieces 39, 41. The modules 35, 37 are preferably positioned so that prior to placement of the pieces 39, 41, the wheel planes 63 are substantially coincident with the primary reference plane 43.

There are first and second references such as reference lines 31 and 33, respectively, and the positioning step includes positioninq each module 35, 37 with respect to the first reference 31 or the second reference 33. Preferably, each module 35, 37 is positioned so that the axis of rotation 29 of its wheel 15 is coincident with a different reference line 31 or 33.

After module positioning, the pieces 39, 41 are placed for permanent attachment as described above. The placing step includes tack welding each piece 39, 41 to a module 35, 37 by applying tack welds 65 alternately to the pieces 39, 41. More specifically, tack welding includes a first tacking step of tacking the first end 57 of the first piece 39 to the first module 35 and tacking the second end 59 of the second piece 41 to the second module 37. Preferably, tack welding further includes a second tacking step of tacking the first end 57 of the second piece 41 to the first module 35 and tacking the second end 59 of the first piece 39 to the second module 37.

Figure 4B:
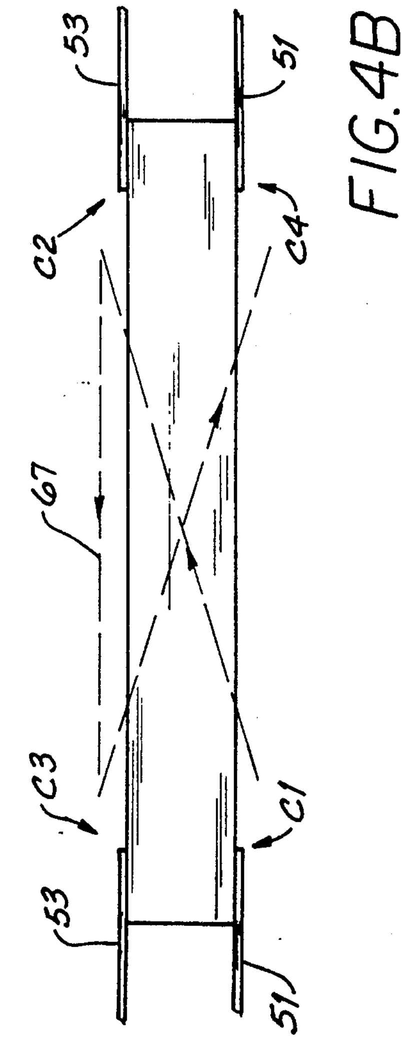
FIG. 4B is a simplified top plan view, generally corresponding to that of FIG. 4A, of aspects of the end truck of FIGS. 1A and 3.
Figure 4A:
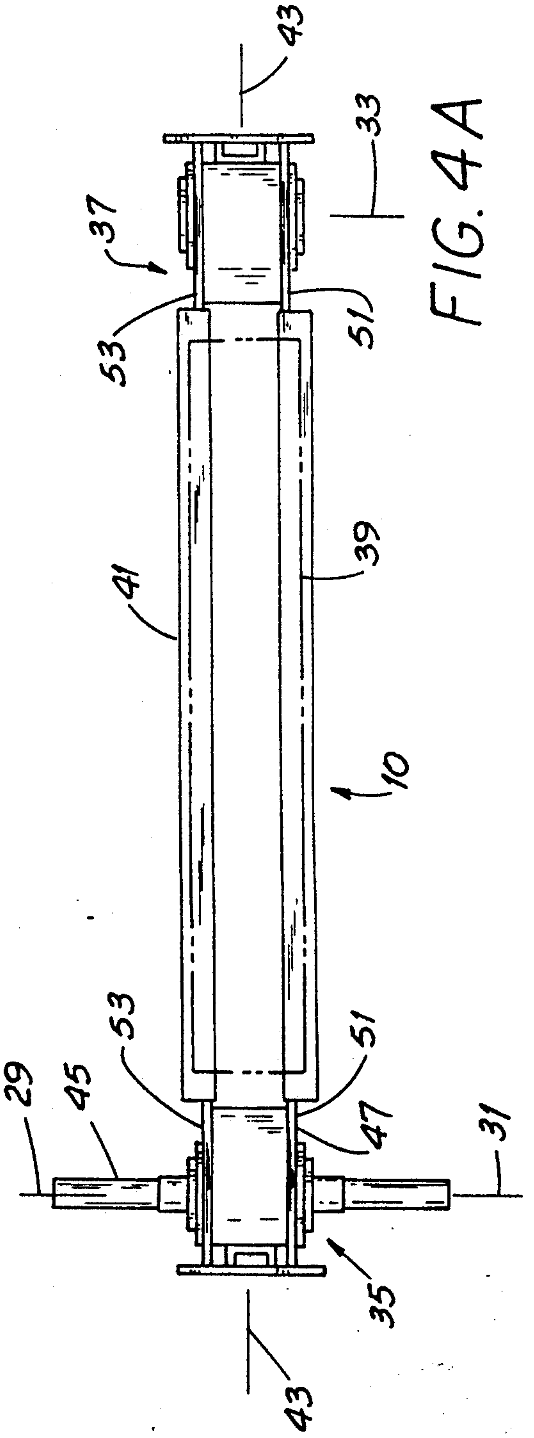
FIG. 4A is a representative top plan view of the end truck shown in FIGS. 1A and 3.

Described another way in view of FIG. 4B, tack welding is at corners C1, C2, C3 and C4 in that sequence. And tacking at a particular corner is by applying a tack weld 65 at each of the four intersections of plate edges A, B, C and D in any sequence. It is to be noted that lines following the C1–C4 sequence trace what may be called a "capped X" pattern 67 shown in dashed lines. The corner designations are merely for explanation. After understanding the foregoing, one of ordinary skill will appreciate that the same result is obtained by tacking at corners C2, C1, C4 and C3 (in that order) or at corners C4, C3, C2 and C1 in that order. Such sequences also trace "capped X" or inverted "capped X" patterns 67.

After temporarily attaching the pieces 39, 41 to the modules 35, 37 by tack welding, the pieces 39, 41 and modules 35, 37 are permanently welded to together. This is by applying final welds alternately to the pieces 39, 41. Permanent welding includes welding the first end 57 of the first piece 39 to the first module 35 and welding the second end 59 of the second piece 41 to the second module 37. It also includes welding the first end 57 of the second piece 41 to the first module 35 and welding the second end 59 of the first piece 39 to the second module 37. After understanding the foregoing, one of ordinary skill will appreciate that the same result is obtained by permanent welding in other sequences developed in view of the tacking sequences. These, too, trace "capped X" or inverted "capped X" patterns 67. Specific aspects of the preferred method recognize that module-piece attachment may be along more than one welding path. Where (as shown in FIG. 5, for example) an end-and-module attachment includes at least two welding paths having differing lengths projected to the axis 55, each piece 39, 41 and each module 35, 37 are permanently welded to one another by the steps of (1) making a final weld along that path adjacent to the first end 57 of the first piece 39 and having the shorter projected length and (2) making a final weld along that path adjacent to the second end 59 of the second piece 41 and having the shorter projected length. By first welding the paths having the shorter projected length(s), one minimizes the distortion arising from the application of heat along that path.

Additional steps include (3) making a final weld along that path adjacent to the first end 57 of the second piece 41 and having the shorter projected length and (4) making a final weld along that path adjacent to the second end 59 of the first piece 39 and having the shorter projected length.

Final welds along paths having longer projected lengths ("long paths") are preferably made in the same order as that in which final welds are made along paths having the shorter projected length ("short paths"). However, it should be appreciated that one practicing the method could apply final weld along long paths in an order different from that used for short paths. One would merely select a different path welding sequence which traces a "capped X" or "inverted capped X" pattern.

It should also be appreciated that when a final weld is applied along a long path when making the specific end truck 10, heat transfer causes greater distortion of a piece 39, 41 than when welding a short path. Use of the described welding sequence minimizes or cancels the effect of the distortion. In the specific situation involving crane end trucks 10, paths having shorter projected lengths are generally normal to the longitudinal axis 55 and paths having longer projected lengths are generally parallel to such axis 55. After understanding the foregoing, one of ordinary skill will appreciate how to minimize heat-induced distortion or its effects when fabricating weldments other than crane end trucks 10.

In a highly preferred method for fabricating an end truck 10, the welding electrode is 0.045 AWS E-71T1 fed at about 300 inches per minute. Power is 23 volts at 210–220 amperes. Shielding is by C25 (75% argon, 25% carbon dioxide) at 35 cu. ft. per hour. For horizontal edges e.g., edges B and C, a leading gun angle is used; for overhead welding, a lagging gun angle is used and for vertical edges, e.g., edges A and D, a box weave weld is used.

From the foregoing, it will be appreciated that one may preassemble and stock wheel modules 35, 37, leaving final end truck fabrication until an order is received. Thereupon, the pieces 39, 41 are cut to proper length and the end truck 10 finally fabricated.

While the principles of the invention have been described with respect to specific embodiments, such embodiments are merely exemplary and the invention is not intended to be limited thereby.

We claim:

1. An improved method for fabricating a weldment of an apparatus having a pair of spaced end modules, each having a pair of attachment plates; a pair of beam-like pieces and at least one reference, such method including the steps of:

positioning the modules with respect to a primary reference;

placing the pieces and modules in position for permanent attachment to one another;

identifying plural paths along each plate for attaching a plate to a piece by welding; and, permanently attaching modules and pieces to one another by applying welds alternately to the pieces and along a path of each of plural plates, whereby heat-induced piece distortion is essentially canceled and misalignment in the finished weldment is substantially avoided.

2. The method of claim 1 wherein the primary reference is a reference plane.

3. The method of claim 2 wherein the modules are first and second modules, each including a wheel having a wheel plane and the wheel planes are substantially coincident with the primary reference plane.

4. The method of claim 2 wherein the apparatus also has first and second references and the positioning step includes positioning each module with respect to the first reference or the second reference.

5. The method of claim 3 wherein the apparatus has first and second references each comprising a reference line, each wheel has an axis of rotation and the positioning step includes positioning each axis of rotation with respect to a reference line.

6. The method of claim 5 wherein each axis of rotation is positioned coincident with a different reference line.

7. The method of claim 1 wherein the placing step includes tack welding each piece to a module by applying tack welds alternately to the pieces.

8. The method of claim 7 wherein the apparatus includes first and second modules, each piece includes first and second ends for attachment to the first and second modules, respectively, and tack welding includes a first tacking step of tacking the first end of the first piece to the first module and tacking the second end of the second piece to the second module.

9. The method of claim 8 wherein tack welding further includes a second tacking step of tacking the first end of the second piece to the first module and tacking the second end of the first piece to the second module.

10. The method of claim 1 wherein the attaching step is completed without significant misalignment of the modules with respect to the primary reference.

11. The method of claim 10 wherein the apparatus includes first and second modules, each piece includes first and second ends for attachment to the first and second modules, respectively, and permanent welding includes welding the first end of the first piece to the first module and welding the second end of the second piece to the second module.

12. The method of claim 11 wherein permanent welding also includes welding the first end of the second piece to the first module and welding the second end of the first piece to the second module.

13. The method of claim 1 wherein:

the apparatus includes first and second modules and first and second pieces;

each piece includes a longitudinal axis and first and second ends for attachment to the first and second modules, respectively;

each of at least two end-and-module attachments include at least two welding paths having differing lengths projected to the axis;

the attaching step includes permanently welding each piece to a module;

and wherein each piece and each module are permanently welded to one another by the steps of:

(1) making a final weld along that path adjacent to the first end of the first piece and having the shorter projected length; and, (2) making a final weld along that path adjacent to the second end of the second piece and having the shorter projected length.

14. The method of claim 13 wherein each piece and each module are permanently welded to one another by the additional steps of:

(3) making a final weld along that path adjacent to the first end of the second piece and having the shorter projected length; and, (4) making a final weld along that path adjacent to the second end of the first piece and having the shorter projected length.

15. The method of claim 14 wherein final welds along paths having longer projected lengths are made in the same order as that in which final welds are made along paths having the shorter projected length.

16. The method of claim 14 wherein the steps for making final welds trace a "capped X" or an "inverted capped X" pattern.

17. The method of claim 15 wherein paths having shorter projected lengths are generally normal to the longitudinal axis and paths having longer projected lengths are generally parallel to such axis.

* * * * *